United States Patent
Kim et al.

(10) Patent No.: US 9,985,257 B2
(45) Date of Patent: May 29, 2018

(54) RECHARGEABLE BATTERY MODULE

(71) Applicant: Samsung SDI Co., Ltd., Yongin-si, Gyeonggi-do (KR)

(72) Inventors: Young-Deok Kim, Yongin-si (KR); Ji-Soon Lim, Yongin-si (KR); Shi-Dong Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days. days.

(21) Appl. No.: 15/296,924

(22) Filed: Oct. 18, 2016

(65) Prior Publication Data

US 2017/0141365 A1 May 18, 2017

(30) Foreign Application Priority Data

Nov. 16, 2015 (KR) ........................ 10-2015-0160505

(51) Int. Cl.
*H01M 2/00* (2006.01)
*H01M 2/10* (2006.01)
*H01M 10/04* (2006.01)
*H01M 2/20* (2006.01)
*H01M 10/00* (2006.01)

(52) U.S. Cl.
CPC ..... *H01M 2/1077* (2013.01); *H01M 10/0468* (2013.01); *H01M 2/206* (2013.01); *H01M 10/00* (2013.01); *H01M 2220/20* (2013.01)

(58) Field of Classification Search
CPC .......... H01M 2/1077; H01M 2220/20; H01M 10/0468; H01M 10/00; H01M 2/206
See application file for complete search history.

(56) References Cited

U.S. PATENT DOCUMENTS

| 2011/0104552 A1* | 5/2011 | Kim | H01M 2/1016 429/151 |
| 2011/0262799 A1* | 10/2011 | Kim | H01M 2/1077 429/156 |

(Continued)

FOREIGN PATENT DOCUMENTS

| EP | 2874201 A1 | 5/2015 |
| JP | 2012-014962 A | 1/2012 |

(Continued)

OTHER PUBLICATIONS

EPO Extended Search Report dated Mar. 22, 2017, for corresponding European Patent Application No. 16199212.8 (6 pages).

*Primary Examiner* — Mark F. Huff
*Assistant Examiner* — Monique M Wills
(74) *Attorney, Agent, or Firm* — Lewis Roca Rothgerber Christie LLP

(57) ABSTRACT

A rechargeable battery module including: a plurality of unit cells arranged along a first direction and electrically coupled to each other via a bus bar; an end support configured to respectively support an outermost one of the unit cells along the first direction, the end support including an electrically insulative material; an end plate coupled to an edge of the end support, at least one of the end support and the end plate including an absorbing portion configured to absorb swelling of the unit cells in the first direction; and a plurality of side plates at opposite ends of the unit cells in a second direction crossing the first kwk.

10 Claims, 7 Drawing Sheets

(56) References Cited

U.S. PATENT DOCUMENTS

| | | |
|---|---|---|
| 2012/0003526 A1 | 1/2012 | Kume et al. |
| 2014/0242429 A1 | 8/2014 | Lee et al. |
| 2015/0079437 A1* | 3/2015 | Jeong .................. H01M 2/1077 |
| | | 429/90 |
| 2017/0054116 A1 | 2/2017 | Morisaku et al. |

FOREIGN PATENT DOCUMENTS

| | | |
|---|---|---|
| KR | 10-2013-0086677 A | 8/2013 |
| WO | WO 2015/170581 A1 | 11/2015 |

* cited by examiner

RECHARGEABLE BATTERY MODULE

CROSS-REFERENCE TO RELATED APPLICATION

This application claims priority to and the benefit of Korean Patent Application No. 10-2015-0160505, filed in the Korean Intellectual Property Office on Nov. 16, 2015, the entire content of which is incorporated herein by reference in its entirety.

BACKGROUND

1. Field

The described technology relates generally to a rechargeable battery module.

2. Description of the Related Art

A rechargeable battery differs from a primary battery in that it is designed to be repeatedly charged and discharged, while the latter is not designed to be recharged. Low-capacity rechargeable batteries are used in small portable electronic devices, such as mobile phones, notebook computers, and camcorders, while high-capacity rechargeable batteries can be used, for example, as a power source for driving motors of a hybrid vehicle, an electric vehicle, and the like.

The rechargeable battery may be used as a single cell (e.g., a single rechargeable battery may be used) in small electronic devices, in a module, such as in a module for driving a motor, in which a plurality of cells are electrically coupled to each other, and/or as a pack in which a plurality of modules are electrically coupled to each other.

As an example, a rechargeable battery module may be formed by arranging a plurality of unit cells along one direction, sequentially providing end supports and end plates at opposite ends of the unit cells in the direction along which the unit cells are arranged, providing side plates at opposite sides of the unit cells in a direction perpendicular to the direction along which the unit cells are arranged, and then welding the side plates with the end plates.

The rechargeable battery module should provide maximum output while occupying a minimum amount of space to provide maximum efficiency in an apparatus on which it is mounted. However, thicknesses of the end support and of the end plate and a relationship between the end plate and the unit cells are limited.

The above information disclosed in this Background section is only to enhance the understanding of the background of the invention, and therefore, it may contain information that does not form the prior art that is already known to a person of ordinary skill in the art.

SUMMARY

Exemplary embodiments of the present invention have been made in an effort to provide a rechargeable battery module that is capable of achieving maximum output in a given space while including an end support and an end plate. That is, exemplary embodiments of the present invention have been made in an effort to provide a rechargeable battery module having increased or maximized efficiency.

A rechargeable battery module according to one embodiment includes: a plurality of unit cells arranged along a first direction and electrically coupled to each other via a bus bar; an end support configured to respectively support an outermost one of the unit cells along the first direction, the end support including an electrically insulative material; an end plate coupled to an edge of the end support, at least one of the end support and the end plate including an absorbing portion configured to absorb swelling of the unit cells in the first direction; and a plurality of side plates at opposite ends of the unit cells in a second direction crossing the first direction, the side plates being coupled to the end plate.

The absorbing portion may include a receiving groove at an inner surface of the end support facing a side surface of the outermost one of the unit cells, and the receiving groove may be concave in the first direction away from the side surface of the outermost one of the unit cells.

The end support may have a plurality of concave grooves at the inner surface of the end support, and the concave grooves may be concave in the first direction away from the side surface of the outermost one of the unit cells.

The absorbing portion may include a gap between the end support and the end plate.

The end support may include: a base having an inner surface configured to support the outermost one of the unit cells; and a reinforcing portion protruding from the base toward the end plate and extending in the second direction. The end plate may contact the end support, and the gap may be between the reinforcing portion of the end support and the end plate.

The reinforcing portion may include: a plurality of first protrusions at opposite ends of the base in a third direction crossing the second direction, having a first thickness, and contacting the end plate; and a second protrusion at a center of the base in the third direction and having a second thickness. The gap may be between the second protrusion and the end plate, and the first and second protrusions may be spaced from each other in the third direction.

The gap may curve between the end support and the end plate generally along the third direction and the first direction.

The gap may be smaller between an area adjacent to the second protrusion and the end plate than it is between the second protrusion and the end plate.

The first protrusions may be concave from a center of the base in the second direction toward outer sides of the base in the third direction, and the second protrusion may be concave from the center of the base in the second direction toward the center of the base third direction.

A distance between each of the first protrusions and the second protrusion in the third direction may be greatest at the center of the base in the second direction.

The end support may have a plurality of outer concave grooves that are concave in the first direction away from the end plate and may be between the first protrusions and the second protrusion.

The end plate may include: a first support portion contacting the first protrusions; a second support portion adjacent to and spaced from the second protrusion by the gap; and a protruding portion extending between the first support portion and the second support portion, protruding between the first and second protrusions, and spaced from the first and second protrusions by the gap.

The end plate may further include a connecting portion coupled to the side support. A first plane formed by an outermost surface of the second support portion may be offset from a second plane formed by an outermost surface of the connecting portion in the first direction.

The rechargeable battery module may further include a plurality of the end supports and a plurality of the end plates. Ones of the ends supports may be configured to respectively support outermost ones of the unit cells along the first direction, and ones of the end plates may be coupled to edges of respective ones of the end supports.

At least one of the end supports and the end plates at each of the outermost ones of the unit cells may include the absorbing portion.

In an exemplary embodiment, because one of the end support and the end plate supporting the unit cells in the first direction includes the absorbing portion, swelling of the unit cells in the first direction can be absorbed.

Because the absorbing portion is provided in one of the end support and the end plate to absorb swelling of the unit cells while not increasing sizes or external dimensions of the end support and the end plate in the first direction, the rechargeable battery module can be implemented within a defined space. That is, efficiency of the rechargeable battery module can be increased or maximized.

DETAILED DESCRIPTION

Figure 1:
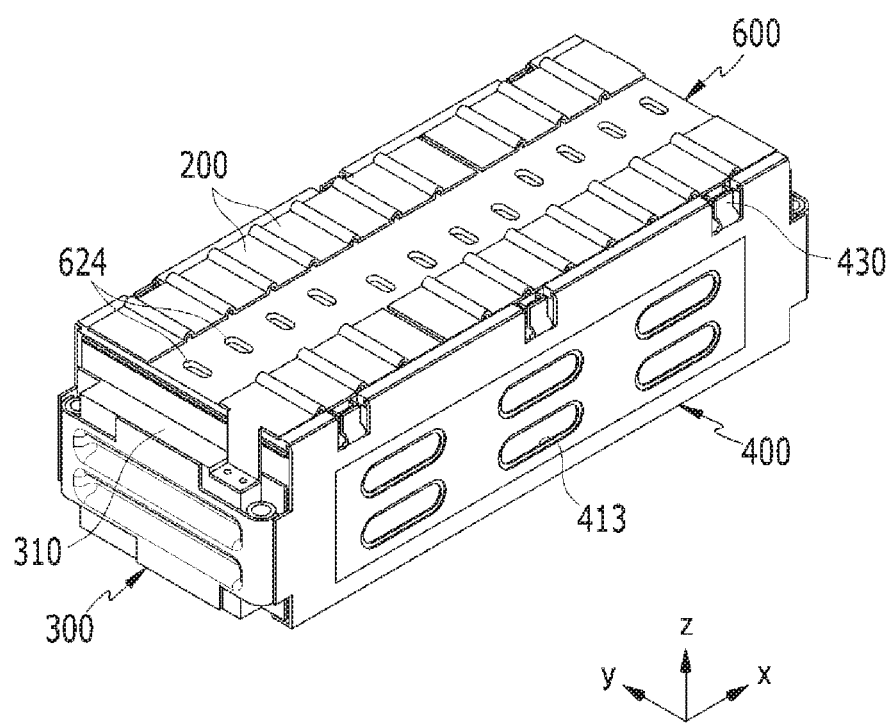
FIG. 1 is a perspective view of a rechargeable battery module according to an exemplary embodiment.

Aspects of the present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention. The drawings and description are to be regarded as illustrative in nature and not restrictive, and like reference numerals designate like elements throughout the specification.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
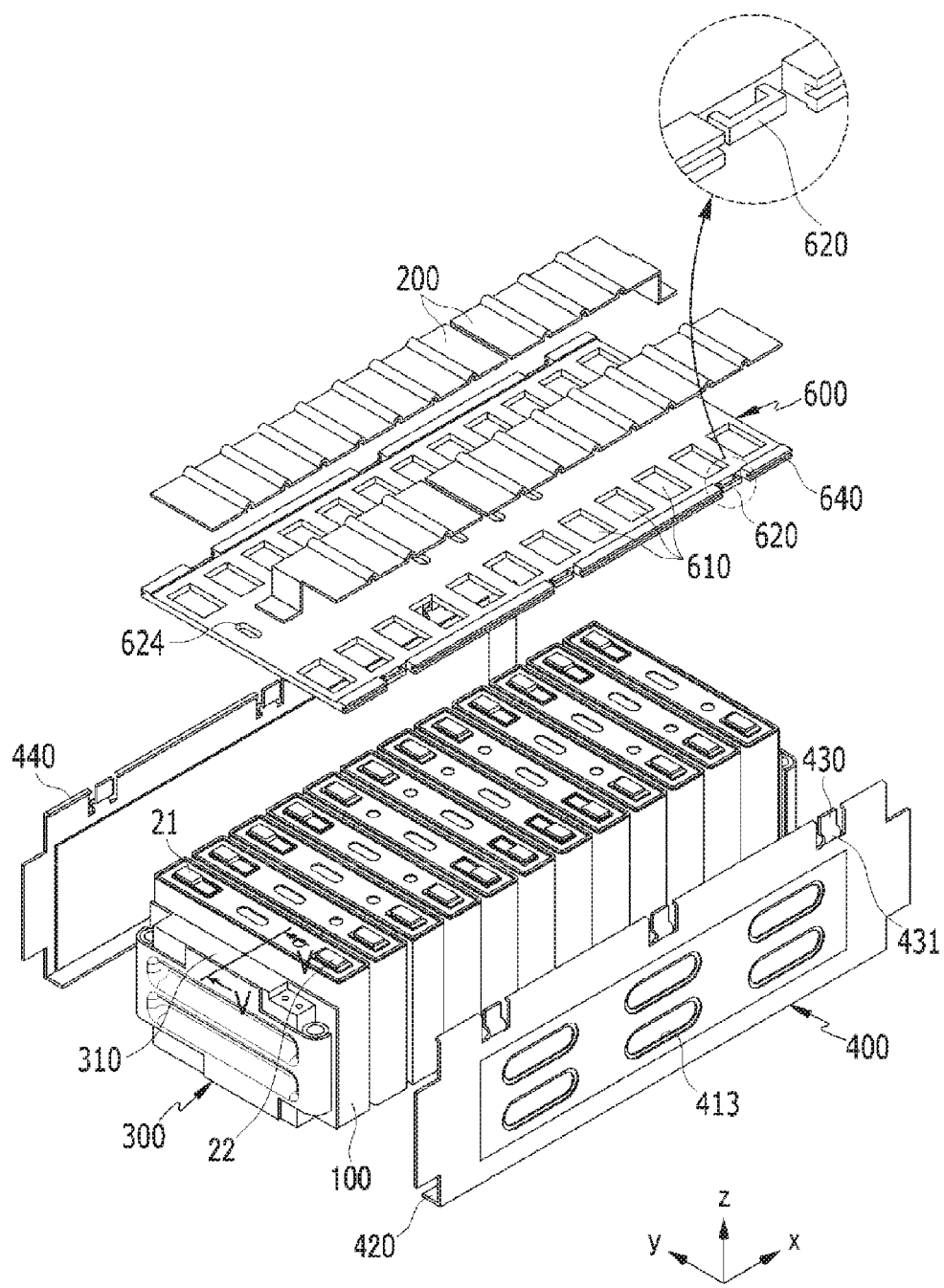
FIG. 2 is an exploded perspective view of the rechargeable battery module illustrated in FIG. 1.

FIG. 1 is a perspective view of a rechargeable battery module according to an exemplary embodiment, and FIG. 2 is an exploded perspective view of the rechargeable battery module illustrated in FIG. 1. Referring to FIGS. 1 and 2, the rechargeable battery module according to an exemplary embodiment includes: unit cells 100 connected to each other via bus bars 200; end supports 310 supporting the outermost unit cells 100; end plates 300 coupled to (e.g., combined to) edges of the end supports 310; and side plates 400 connected to the end plates 300.

Each of the unit cells 100 is a rechargeable battery. The unit cells 100 are arranged along a first direction (e.g., an x-axis direction) to neighbor each other and are electrically and mechanically connected to each other, thereby forming the rechargeable battery module. The bus bars 200 are disposed above the rechargeable battery module (e.g., above the unit cells 100) to electrically couple adjacent ones of the unit cells 100 to each other.

For example, one of the bus bars 200 connects four neighboring unit cells 100 to each other in parallel, another one of the bus bars 200 connects another four unit cells 100 to each other in parallel, and then the eight unit cells 100 connected to each other in parallel are connected to yet another four unit cells 100 in series.

The end supports 310 may include (e.g., may be made of) an electrically insulative material and are formed as a pair (e.g., the rechargeable battery module includes two end supports 310). The end supports 310 are respectively disposed at opposite ends of the unit cells 100 in the first direction (e.g., the x-axis direction) to support the outermost ones of the unit cells 100 in the first direction while being insulated therefrom. The end plates 300 are provided as a pair (e.g., the rechargeable battery includes two end plates 300). The end plates 300 are respectively connected to outer edges of the end supports 310 to support the outermost unit cells 100 via the end supports 310.

The end plates 300 include (e.g., are formed of) a metal (e.g., stainless steel), providing sufficient strength to the rechargeable battery module at the outermost sides thereof in the first direction. The end supports 310 electrically insulate the end plates 300 from the unit cells 100 while supporting the unit cells 100, which are arranged between the end plates 300.

The side plates 400 are provided as a pair (e.g., the rechargeable battery module includes two side plates 400). The side plates 400 are disposed at opposite ends in a second direction (e.g., a y-axis direction) crossing the first direction and are connected to the end plates 300. The side plates 400 respectively support opposite ends of the unit cells 100 in the second direction.

The end plates 300 and the side plates 400 are connected to each other, and a top side of the unit cells 100, which are accommodated in a space defined by the end supports 310 and the side plates 400, is covered by a bus bar holder 600. The bus bar holder 600 includes bus bar openings 610 (e.g., bus bar holes), and the bus bars 200 are electrically coupled to the unit cells 100 via the bus bar openings 610.

Figure 3:
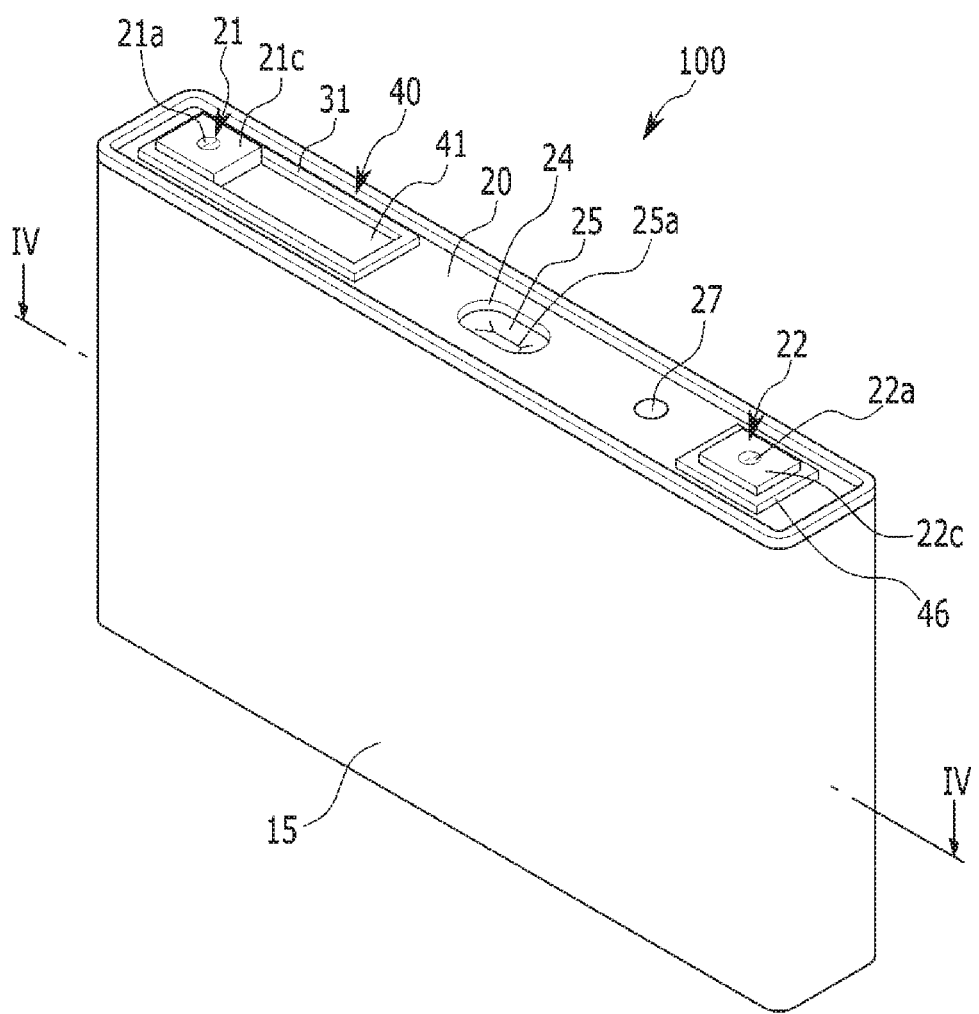
FIG. 3 is a perspective view of the rechargeable battery illustrated in FIG. 2.
Figure 4:
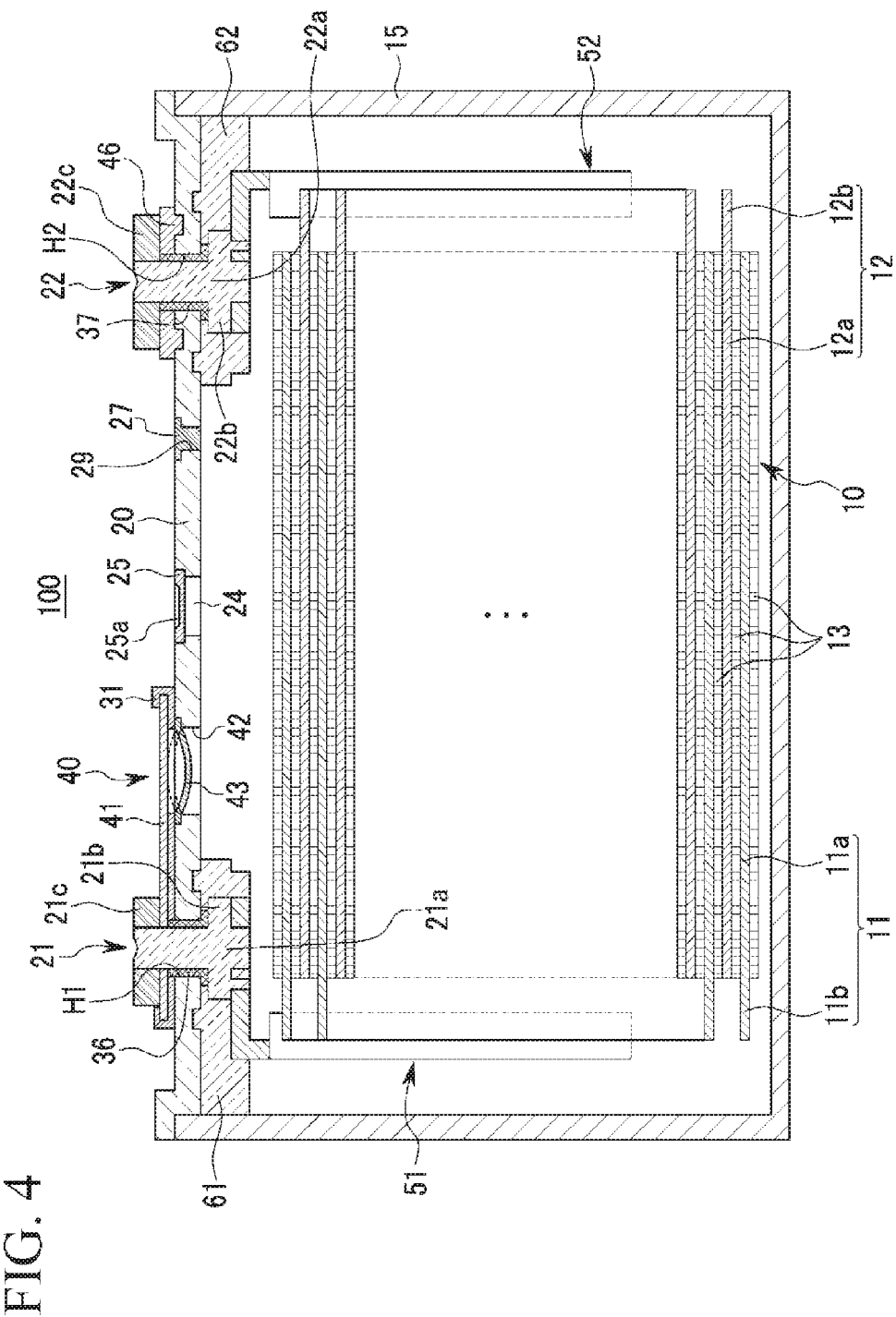
FIG. 4 is a cross-sectional view taken along the line IV-IV of FIG. 3.

FIG. 3 is a perspective view of the rechargeable battery illustrated in FIG. 2, and FIG. 4 is a cross-sectional view taken along the line IV-IV of FIG. 3. Referring to FIGS. 3 and 4, the unit cell 100 is a rechargeable battery configured to charge and discharge a current.

Each unit cell 100 includes: an electrode assembly 10; a case 15 for accommodating the electrode assembly 10; a cap plate 20 coupled to the case 15 at an opening thereof; a first electrode terminal (hereinafter referred to as the "negative electrode terminal") 21 and a second electrode terminal (hereinafter referred to as the "positive electrode terminal") 22 which are provided in the cap plate 20; and an external short-circuit assembly 40 (e.g., an external short-circuit portion) adjacent to (e.g., provided near) the negative electrode terminal 21.

For example, the electrode assembly 10 is formed by disposing a first electrode (hereinafter referred to as the "negative electrode") 11 and a second electrode (hereinafter referred to as the "positive electrode") 12 at opposite surfaces of a separator 13, serving as an insulator, and winding the negative electrode 11, the separator 13, and the positive electrode 12 together in a jelly-roll state.

The negative and positive electrodes 11 and 12 respectively include current collectors having coated regions 11a and 12a, where an active material is coated, and uncoated regions 11b and 12b, which are exposed portions of the current collectors where an active material is not coated thereon. The current collectors may be metal plates.

The uncoated region 11b of the negative electrode 11 is formed at one end portion of the negative electrode 11 along the wound electrode assembly 10. The uncoated region 12b of the positive electrode 12 is formed at one end portion of the positive electrode 12 along the wound electrode assembly 10. The uncoated regions 11b and 12b are respectively disposed at opposite ends of the electrode assembly 10.

For example, the case 15 has a substantial cuboid shape to define a space for accommodating the electrode assembly 10 and an electrolyte solution, and the opening is formed at one side of the cuboid to connect the space for accommodating the electrode assembly 10 to the outside. The opening allows the electrode assembly 10 to be inserted into the case 15.

The cap plate 20 is provided at (e.g., is provided in) the opening of the case 15 to close and seal the opening of the case 15. For example, the case 15 and the cap plate 20 may be welded to each other when they are made of aluminum.

In addition, the cap plate 20 includes an electrolyte injection opening 29, a vent opening 24 (e.g., a vent hole), and terminal openings H1 and H2 (e.g., terminal holes). After the cap plate 20 is coupled to the case 15, the electrolyte injection opening 29 allows the electrolyte solution to be injected into the case 15. After the injection of the electrolyte solution, the electrolyte injection opening 29 is sealed by a sealing cap 27.

The vent opening 24 is closed and sealed by a vent plate 25 so as to selectively discharge internal pressure of the unit cell 100. For example, if the internal pressure of the unit cell 100 reaches a certain pressure (e.g., a predetermined pressure), the vent plate 25 ruptures to open the vent opening 24. The vent plate 25 is provided with a notch 25a that induces the rupture.

The bus bar holder 600 further includes a holder vent opening 624 (e.g., a holder vent hole) corresponding to (e.g., arranged over) the vent opening 24 (refer to FIGS. 1 and 2). Accordingly, the internal pressure discharged via the vent opening 24 may be discharged to the outside of the rechargeable battery module via the holder vent opening 624. That is, the discharge of the internal pressure via the vent opening 24 is not blocked by the bus bar holder 600.

The negative and positive electrode terminals 21 and 22 are provided in terminal openings H1 and H2 of the cap plate 20, respectively, and are electrically coupled to the electrode assembly 10. For example, the negative electrode terminal 21 is electrically coupled to the negative electrode 11 of the electrode assembly 10, and the positive electrode terminal 22 is electrically coupled to the positive electrode 12 of the electrode assembly 10. Accordingly, the electrode assembly 10 is drawn out of the case 15 via the negative and positive electrode terminals 21 and 22.

Because the negative and positive electrode terminals 21 and 22 have the same or substantially the same structure inside the case 15 (e.g., under the cap plate 20), the features and/or components of the negative and positive electrode terminals 21 and 22 inside the case 15 will be described together. The structures of each of the negative and positive electrode terminals 21 and 22 outside of the case 15 (e.g., over or outside of the cap plate 20) that are different from each other will be separately described.

The negative and positive electrode terminals 21 and 22 respectively include rivet terminals 21a and 22a respectively provided in the terminal openings H1 and H2 of the cap plate 20, flanges 21b and 22b that extend from (e.g., are integrally formed with) the rivet terminals 21a and 22a inside the case 15, and plate terminals 21c and 22c that are disposed outside of the case 15 to be coupled to the rivet terminals 21a and 22a by, for example, riveting or welding.

First and second electrode gaskets 36 and 37 (hereinafter referred to as the "negative electrode gasket 36" and the "positive electrode gasket 37") are respectively provided between the rivet terminals 21a and 22a of the negative and positive electrode terminals 21 and 22 and inner surfaces of the terminal openings H1 and H2, thereby sealing between and electrically insulating the rivet terminals 21a and 22a of the negative and positive electrode terminals 21 and 22 and the cap plate 20.

The negative and positive electrode gaskets 36 and 37 further extend between the flanges 21b and 22b and an inner surface of the cap plate 20 to further seal between and electrically insulate the flanges 21b and 22b and the cap plate 20. For example, the negative and positive electrode gaskets 36 and 37 prevent leakage of the electrolyte solution via the terminal openings H1 and H2 when the negative and positive electrode terminals 21 and 22 are provided in the cap plate 20.

First and second electrode lead tabs 51 and 52 (hereinafter referred to as the "negative electrode lead tab 51" and the "positive electrode lead tab 52") electrically couple the negative and positive electrode terminals 21 and 22 to the negative and positive electrodes 11 and 12 of the electrode assembly 10, respectively. For example, the negative and positive electrode lead tabs 51 and 52 are coupled to (e.g., combined to) lower ends of the rivet terminals 21a and 22a, and the lower ends of the rivet terminals 21a and 22a are then caulked, such that the negative and positive electrode lead tabs 51 and 52 are supported by the flanges 21b and 22b and are connected to the lower ends of the rivet terminals 21a and 22a.

First and second electrode insulating members 61 and 62 (hereinafter referred to the "negative electrode insulating member 61" and the "positive electrode insulating member 62") are respectively provided between the negative and positive electrode lead tabs 51 and 52 and the cap plate 20 to electrically insulate the negative and positive electrode lead tabs 51 and 52 from the cap plate 20. In addition, one side of each of the negative and positive electrode insulating members 61 and 62 is coupled to (e.g., combined to) the cap plate 20 while the other side thereof surrounds a periphery of (e.g., encloses) the negative and positive electrode lead tabs 51 and 52, the rivet terminals 21a and 22a, and the flanges 21b and 22b, thereby stabilizing a connection structure therebetween.

The external short-circuit assembly 40 will be further described in connection with the plate terminal 21c of the negative electrode terminal 21, and a top plate 46 will be described in connection with the plate terminal 22c of the positive electrode terminal 22.

The external short-circuit assembly 40 is adjacent to the negative electrode terminal 21 and includes a short-circuit tab 41 and a short-circuit member 43 that are separated from or short-circuited to each other depending on (e.g., according to) the internal pressure in the case 15. The short-circuit tab 41 is electrically coupled to the rivet terminal 21a of the negative electrode terminal 21 and is disposed outside of the cap plate 20 with the insulating member 31 interposed therebetween.

The insulating member 31 is provided between the short-circuit tab 41 and the cap plate 20 to electrically insulate the short-circuit tab 41 from the cap plate 20. That is, the cap plate 20 is electrically insulated from the negative electrode terminal 21.

The short-circuit tab 41 and the plate terminal 21c are both coupled to an upper end of the rivet terminal 21a, and the upper end of the rivet terminal 21a is then caulked, such that the short-circuit tab 41 and the plate terminal 21c are combined to the upper end of the rivet terminal 21a. Accordingly, the short-circuit tab 41 and the plate terminal 21c are fixed to the cap plate 20 with the insulating member 31 interposed therebetween.

The short-circuit member 43 is provided in a short-circuit opening 42 (e.g., a short-circuit hole) formed in the cap plate 20 to close and seal the short-circuit opening 42. The short-circuit tab 41 is connected to the negative electrode terminal 21 and extends along an edge of (e.g., extends over) the short-circuit member 43. Accordingly, the short-circuit tab 41 and the short-circuit member 43 may correspond to (e.g., may be in or over) the short-circuit opening 42 to face each other. And, in a first state, the short-circuit tab 41 and the short-circuit member 43 may be separated from each other, and in a second state, may be short-circuited (e.g., electrically connected) to each other (as indicated by an imaginary line) when the short-circuit member 43 is inversely deformed due to increased internal pressure in the unit cell 100.

The top plate 46 is adjacent to the positive electrode terminal 22 and electrically couples the plate terminal 22c of the positive electrode terminal 22 to the cap plate 20. For example, the top plate 46 is interposed between the plate terminal 22c and the cap plate 20, and is penetrated by the rivet terminal 22a (e.g., the rivet terminal 22a extends through the top plate 46).

Accordingly, the top plate 46 and the plate terminal 22c are coupled to an upper end of the rivet terminal 22a, and the upper end of the rivet terminal 22a is then caulked, such that the top plate 46 and the plate terminal 22c are combined to the upper end of the rivet terminal 22a. The plate terminal 22c is provided outside of the case 15, and the top plate 46 is interposed therebetween.

The positive electrode gasket 37 is provided to further extend between the rivet terminal 22a and the top plate 46. That is, the positive electrode gasket 37 prevents the rivet terminal 22a and the top plate 46 from being directly electrically coupled to each other. For example, the rivet terminal 22a is electrically coupled to (e.g., is indirectly electrically coupled to) the top plate 46 via the plate terminal 22c.

Referring to FIGS. 1 and 2, the side plate 400 of the rechargeable battery module includes penetration openings 413 (e.g., penetration holes or through-holes) at sides of the unit cells 100. For example, the penetration openings 413 reduce the weight of the side plate 400 and the rechargeable battery module.

A plurality of penetration openings 413 may be arranged along the x-axis and the z-axis. Any number of penetration openings 413 may be formed in the side plate 400 as long as sufficient strength of the side plate 400 is maintained, thereby reducing the weight of the side plate 400.

The side plate 400 is formed of thin plate sheet metal having a certain thickness (e.g., about 0.8 mm). For example, the side plate 400 may be formed of a thin stainless steel plate.

In addition, the side plate 400 includes a flange 420, which is bent from a lower end of the side plate 400 in a third direction (e.g., the z-axis direction) crossing the first and second directions and extends in the second direction (e.g., y-axis direction) to support the unit cells 100.

The flange 420 makes it possible to do without a lower plate in the rechargeable battery module, which would otherwise support a lower end of the unit cells 100, thereby allowing the rechargeable battery module to be lightweight (e.g., the rechargeable battery module, according to some embodiments, does not include a lower support supporting the lower end of the unit cells 100). Further, when the rechargeable battery module is mounted on or in an apparatus (e.g., an electric vehicle), the flange 420 allows the unit cells 100 to contact and/or to be adhered to a cooling device included in the apparatus, thereby making it possible to effectively cool the unit cells 100.

A cutout connection portion 430 (e.g., a cutout connector or a connector) is provided at an upper end of the side plate 400 opposite the flange 420. The connection portion 430 includes an elastic portion 431 which has an elastic force that is directed toward the bus bar holder 600 from the side plate 400, and the connection portion 430 may be elastically connected to the bus bar holder 600 by the elastic force.

As an example, the connection portion 430 may be connected to a bracket 620 provided at a corresponding position of the bus bar holder 600 by welding. When the bus bar holder 600 is formed of a synthetic resin that is an electrically insulative material, the bracket 620 may be insert-molded to be provided in the bus bar holder 600.

For example, the elastic force of the elastic portion 431 may absorb a parts tolerance (e.g., an offset) between the side plate 400 and the bus bar holder 600. When being laser-welded, the connection portion 430 and the bracket 620 may closely contact each other, thereby ensuring welding performance and improving welding quality.

In the rechargeable battery module, the bus bar holder 600 includes coupling grooves 640 that are disposed at opposite ends in the second direction (e.g., the y-axis direction), that are formed along (e.g., extend along) the first direction (e.g., the x-axis direction), and have walls which are separated from each other in the third direction (e.g., the z-axis direction). The side plate 400 includes coupling portions 440 (e.g., coupling extensions) that are coupled to the coupling grooves 640. Because the coupling portions 440 are coupled to the coupling grooves 640, the side plate 400 and the bus bar holder 600 are coupled to each other by a fastening force in the third direction.

The unit cells 100 are covered by the bus bar holder 600, the bus bars 200 connect ones of the units cells 100 to each other via the bus bar openings 610, and the end plates 300 and the side plates 400 are connected to each other with the end supports 310 therebetween such that the unit cells 100 are accommodated therebetween and are supported. Subsequently, the connection portion 430 of the side plate 400 is welded to the bracket 620 of the bus bar holder 600, thereby forming the rechargeable battery module.

For example, sides of the unit cells 100 are supported by the end plate 300 and the side plate 400, top sides of the unit cells 100 are supported by the bus bar holder 600, and a bottom side thereof is supported and accommodated by the flange 420 of the side plate 400.

Figure 5:
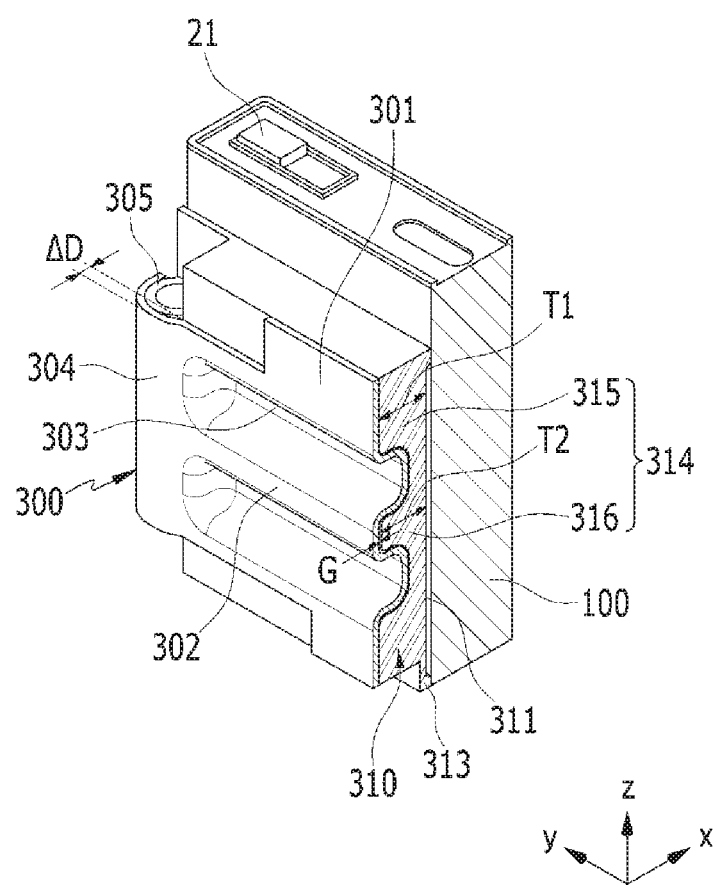
FIG. 5 is a cross-sectional perspective view taken along the line V-V of FIG. 2.

FIG. 5 is a cross-sectional perspective view taken along the line V-V of FIG. 2. Referring to FIG. 5, at least one of the end support 310 and the end plate 300 includes an absorbing portion 311 (G, ΔD) for absorbing swelling of the unit cells 100 in the first direction.

The absorbing portion 311 (G, ΔD) absorbs the swelling of the unit cells 100 in the first direction of the rechargeable battery module, such that the rechargeable battery module as a whole does not swell (e.g., such that the exterior dimensions of the rechargeable battery module do not increase). That is, the absorbing portion 311 (G, ΔD) alleviates a need for additional space to accommodate swelling of the rechargeable battery module to be provided outside of the rechargeable battery module.

Figure 6:
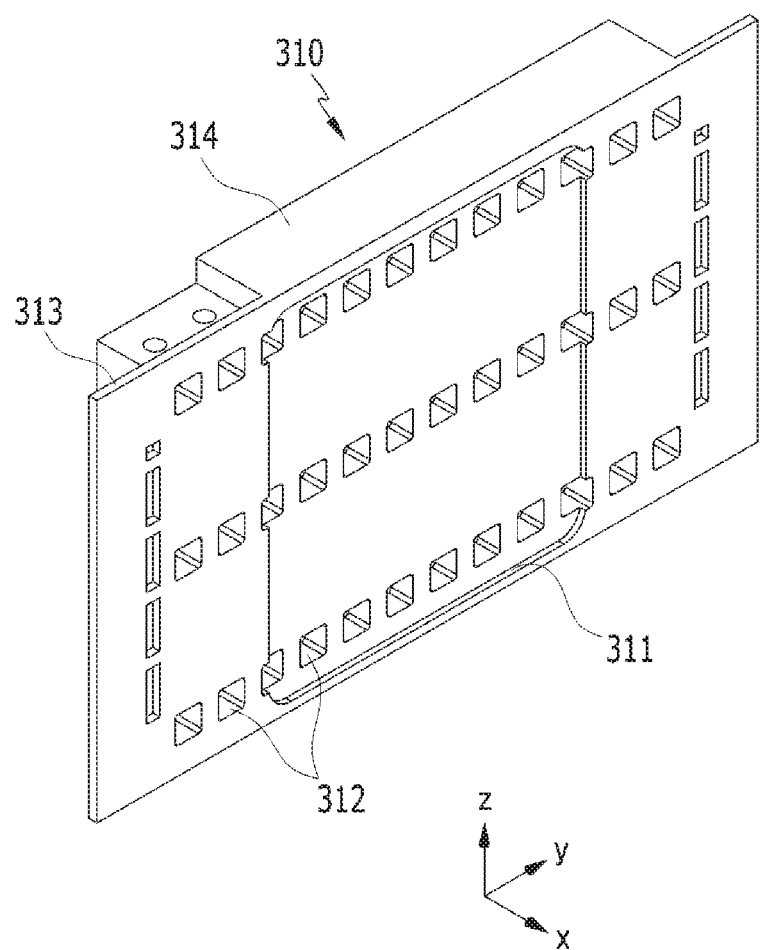
FIG. 6 is a perspective view of an inner side of an end support according to an exemplary embodiment.

FIG. 6 is a perspective view of an inner side of an end support. Referring to FIGS. 5 and 6, the absorbing portion includes (e.g., may be) a receiving groove 311 that is formed at an inner surface of the end support 310 facing (e.g., closely attached to) a side surface of the outermost unit cell 100.

The receiving groove 311 may be concavely formed at an inner surface of the absorbing portion in a direction (e.g., in the first direction) away from the side surface of the outermost unit cell 100 to absorb the swelling of the unit cells 100 in the first direction (e.g., the x-axis direction).

For example, the receiving groove 311 is disposed at a center of the inner surface of the end support 310 where the swelling is greatest and absorbs the swelling of all of the unit cells 100 at the outermost unit cell 100.

The end support 310 includes a plurality of inner concave grooves 312 at the inner surface thereof. The inner concave grooves 312 are concavely formed in a direction away from the side surface of the outermost unit cell 100 (e.g., in the first direction) and reduce the weight of the end support 310.

In addition, the absorbing portion includes (e.g., may be) a gap (G) between the end support 310 and the end plate 300. After first absorbing the swelling in the receiving groove 311 (e.g., when the receiving groove 311 has been filled or substantially filled by the swelled unit cells 100), the gap (G) may secondly absorb the swelling at the end support 310.

Figure 7:
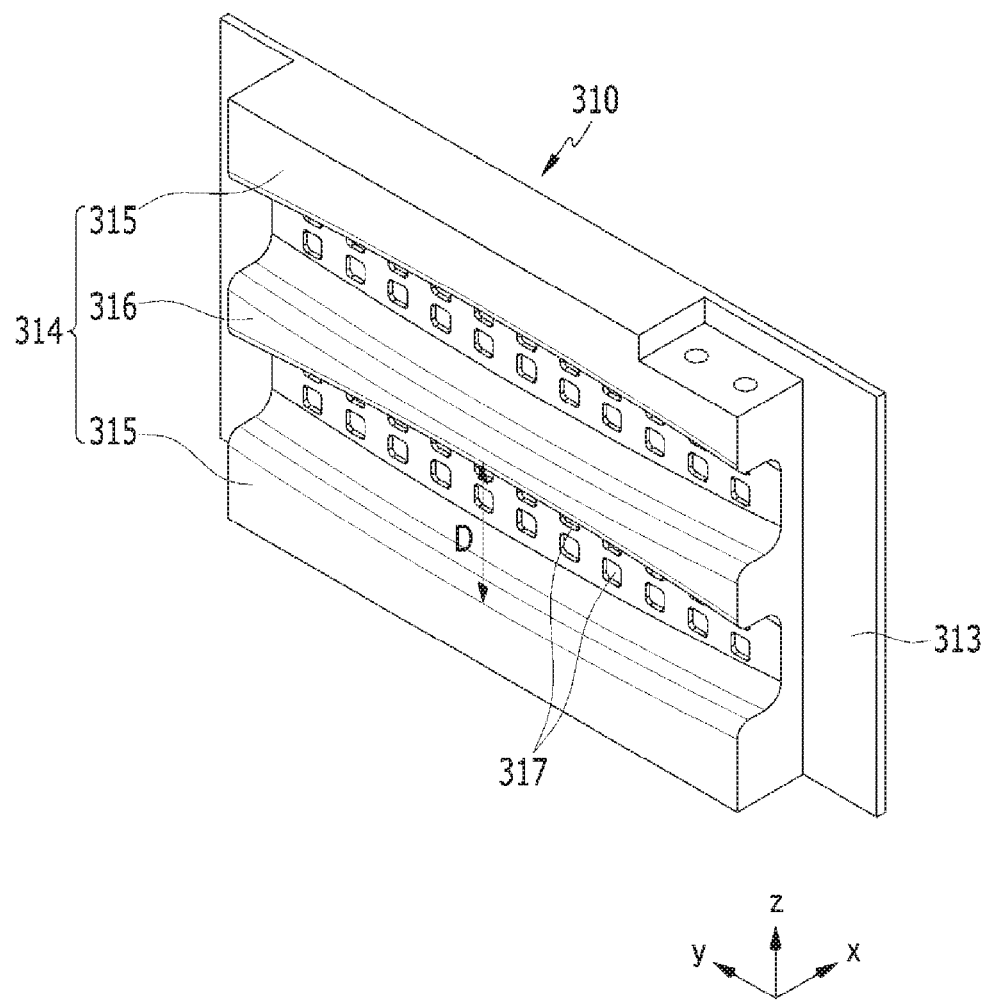
FIG. 7 is a perspective view of an outer side of the end support according to an exemplary embodiment.

FIG. 7 is a perspective view of an outer side of the end support. Referring to FIGS. 5 to 7, the end support 310 includes a base 313 at (e.g., forming) the inner surface of the end support 310 that supports the outermost unit cell 100, and a reinforcing portion 314 that protrudes toward the end plate 300 from the base 313. For example, the reinforcing portion 314 protrudes from the base 313 in a direction away from the unit cells 100.

The reinforcing portion 314 of the end support 310 is formed in a plurality and extend in the second direction (e.g., the y-axis direction). Ones of the reinforcing portion 314 are separated from each other in the third direction (e.g., the z-axis direction). The end plate 300 is supported by and coupled to the end support 310 while having the gap (G) between the reinforcing portion 314 and the end plate 300.

The reinforcing portion 314 includes a pair of first protrusions 315 and a second protrusion 316. The first protrusions 315 are formed at opposite ends of the base 313 in the third direction, have a first thickness T1 in the first direction, and support the end plate 300.

The second protrusion 316 is formed at a center of the base 313 in the third direction and has a second thickness T2 in the first direction to form the gap (G) with the end plate 300. For example, the second protrusion 316 may maintain the gap (G) between the end support 310 and the end plate 300 when the swelling of the unit cells 100 is relatively small and may be supported by (e.g., may contact) the end plate 300 when the swelling is relatively large.

In addition, the gap (G) extends in a curved shape between the end support 310 and the end plate 300 along the third direction and the first direction depending on shapes and arrangements of the first and second protrusions 315 and 316. Accordingly, when the swelling occurs in the first direction, the gap (G) may absorb the swelling in the first and third directions.

In addition, the gap (G) may be smallest at the first protrusions 315 and greatest at the second protrusion 316. For example, the gap (G) may begin at the first protrusions 315 and flexibly extend to the second protrusion 316.

The first protrusions 315 are concavely formed toward outer sides of the base 313 in the third direction from a center of the base 313 in the second direction while extending in the second direction. In addition, the second protrusion 316 is concavely formed toward the center of the base 313 in the third direction from the center of the base 313 in the second direction while extending in the second direction.

For example, the first protrusions 315 and the second protrusion 316 are formed such that a distance D in the third direction between the second protrusion 316 and each of the first protrusions 315 is the greatest at a center thereof in the second direction and is the smallest at the outer sides thereof of the second direction. Accordingly, at a center of the end support 310, a supporting force (e.g., resiliency) of the first and second protrusions 315 and 316 is weakest.

The swelling of the unit cells 100 is greatest at a center of a side thereof in the first direction. Accordingly, the swelling absorbed by the receiving groove 311 and the gap (G) in the end support 310 and the end plate 300 may be maximally absorbed by the center of the second protrusion 316.

In addition, the end support 310 includes a plurality of outer concave grooves 317 that are concavely formed between the first protrusion 315 and the second protrusion 316 in a direction away from the end plate 300.

The outer concave grooves 317 do not interfere with or affect the gap (G) between the end support 310 and the end plate 300. In addition, the outer concave grooves 317 may reduce the weight of the end support 310 along with the inner concave grooves 312.

The end plate 300 includes a first support portion 301 supported by the first protrusions 315, a second support portion 302 maintaining the gap (G) with the second protrusion 316 (e.g., the second support portion 302 is spaced from the second protrusion 316 by the gap (G)), and a protruding portion 303 extending between (e.g., connecting) the first support portion 301 to the second support portion 302.

The protruding portion 303 is disposed between each of the first protrusions 315 and the second protrusion 316 of the end support 310 and forms, in part, the gap (G) that is between the end support 310 and the end plate 300 and absorbs the swelling along with the second support portion 302.

In addition, the end plate 300 further includes the connecting portion 304 that is connected to the side plate 400. The connecting portion 304 is connected to a bushing 305 that is inserted therein in the third direction, and the bushing 305 increases the strength of the end plate 300.

The absorbing portion is recessed in the first direction and includes (e.g., is formed by) a distance from an outermost side of the second support portion 302 to an outermost side of the connecting portion 304 (ΔD) (e.g., the outermost side of the second support portion 302 is offset from the outermost side of the connecting portion 304 to form the absorbing portion). For example, the distance (ΔD) allows the swelling to be absorbed within the end plate 300.

Accordingly, after absorbing the swelling in the receiving groove 311 and in the gap (G), the end plate 300 thirdly absorbs swelling by deforming to reduce the distance (ΔD). The end plate 300, including the first and second support portions 301 and 302 and the protruding portion 303, absorbs the swelling by deforming relative to the connecting portion 304 of the end plate 300 in the first direction.

As described above, an exemplary embodiment may gradually absorb the swelling of the unit cells 100 via the receiving groove 311, the gap (G), and the distance (ΔD) that are sequentially arranged along the first direction. Accordingly, because the outer dimensions of the rechargeable battery module do not increase even as the unit cells 100 swell, maximum efficiency can be achieved.

While this disclosure has been described in connection with what is presently considered to be practical exemplary embodiments, it is to be understood that the invention is not limited to the disclosed embodiments, but is intended to cover various modifications and equivalent arrangements included within the spirit and scope of the appended claims and their equivalents.

Description of Symbols

| | |
|---|---|
| 10: electrode assembly | 11: first electrode |
| 11a, 12a: coated region | 11b, 12b: uncoated region |
| 12: second electrode | 13: separator |
| 15: case | 20: cap plate |
| 21: first electrode terminal | 21a, 22a: rivet terminal |
| 21b, 22b: flange | 1c, 22c: plate terminal |
| 22: second electrode terminal | 24: vent opening |
| 25: vent plate | 27: sealing cap |
| 29: electrolyte injection opening | 31: insulating member |
| 36, 37: first and second electrode gasket | |
| 40: external short-circuit assembly | |
| 41: short-circuit tab | 43: short-circuit member |
| 46: top plate | 51, 52: electrode lead tabs |
| 61, 62: electrode insulating members | 100: unit cell |
| 200: bus bar | 300: end plate |
| 301, 302: first, second support portion | 303: protruding portion |
| 304: connecting portion | 305: bushing |
| 310: end support | 311: receiving groove |
| 312: inner concave groove | 313: base |
| 314: reinforcing portion | 315: first protrusion |
| 316: second protrusion | 317: outer concave grooves |
| 400: side plate | 413: opening |
| 420: flange | 430: connecting portion |
| 431: elastic portion | 440: coupling portion |
| 600: bus bar holder | 610: bus bar opening |
| 620: bracket | 624: holder vent opening |
| 640: coupling groove | D, ΔD: distance |
| G: gap | H1, H2: terminal opening |
| T1, T2: first, second thickness | |

What is claimed is:

1. A rechargeable battery module comprising:
   a plurality of unit cells arranged along a first direction and electrically coupled to each other via a bus bar;
   an end support configured to respectively support an outermost one of the unit cells along the first direction, the end support comprising an electrically insulative material;
   an end plate coupled to an edge of the end support, at least one of the end support and the end plate comprising an absorbing portion configured to absorb swelling of the unit cells in the first direction; and
   a plurality of side plates at opposite ends of the unit cells in a second direction crossing the first direction, the side plates being coupled to the end plate,
   wherein the absorbing portion comprises a gap between the end support and the end plate,
   wherein the end support comprises:
      a base having an inner surface configured to support the outermost one of the unit cells; and
      a reinforcing portion protruding from the base toward the end plate and extending in the second direction,
   wherein the end plate contacts the end support and the gap is between the reinforcing portion of the end support and the end plate,
   wherein the reinforcing portion comprises:
      a plurality of first protrusions at opposite ends of the base in a third direction crossing the second direction, having a first thickness, and contacting the end plate; and
      a second protrusion at a center of the base in the third direction and having a second thickness, the gap being between the second protrusion and the end plate, and wherein the first and second protrusions are spaced from each other in the third direction.

2. The rechargeable battery module of claim 1, wherein the gap curves between the end support and the end plate generally along the third direction and the first direction.

3. The rechargeable battery module of claim 2, wherein the gap is smaller between an area adjacent to the second protrusion and the end plate than it is between the second protrusion and the end plate.

4. The rechargeable battery module of claim 1, wherein the first protrusions are concave from a center of the base in the second direction toward outer sides of the base in the third direction, and
wherein the second protrusion is concave from the center of the base in the second direction toward the center of the base in the third direction.

5. The rechargeable battery module of claim 4, wherein a distance between each of the first protrusions and the second protrusion in the third direction is greatest at the center of the base in the second direction.

6. The rechargeable battery module of claim 1, wherein the end support has a plurality of outer concave grooves that are concave in the first direction away from the end plate and are between the first protrusions and the second protrusion.

7. The rechargeable battery module of claim 1, wherein the end plate comprises:
a first support portion contacting the first protrusions;
a second support portion adjacent to and spaced from the second protrusion by the gap; and
a protruding portion extending between the first support portion and the second support portion, protruding between the first and second protrusions, and spaced from the first and second protrusions by the gap.

8. The rechargeable battery module of claim 7, wherein the end plate further comprises a connecting portion coupled to the first and second support portions, and
wherein a first plane formed by an outermost surface of the second support portion is offset from a second plane formed by an outermost surface of the connecting portion in the first direction.

9. The rechargeable battery module of claim 1, further comprising a plurality of the end supports and a plurality of the end plates,
wherein ones of the end supports are configured to respectively support outermost ones of the unit cells along the first direction, and ones of the end plates are coupled to edges of respective ones of the end supports.

10. The rechargeable battery module of claim 9, wherein at least one of the end supports and the end plates at each of the outermost ones of the unit cells comprise the absorbing portion.

* * * * *